United States Patent
You et al.

(10) Patent No.: US 9,611,377 B2
(45) Date of Patent: *Apr. 4, 2017

(54) HALOGEN-FREE THERMOSETTING RESIN COMPOSITION, AND PREPREG AND LAMINATE FOR PRINTED CIRCUITS USING THE SAME

(71) Applicant: SHENGYI TECHNOLOGY CO., LTD., Dongguan (CN)

(72) Inventors: Jiang You, Dongguan (CN); Tianhui Huang, Dongguan (CN); Zhongqiang Yang, Dongguan (CN)

(73) Assignee: SHENGYI TECHNOLOGY CO., LTD., Dongguan (CN)

( * ) Notice: Subject to any disclaimer, the term of this patent is extended or adjusted under 35 U.S.C. 154(b) by 98 days.

This patent is subject to a terminal disclaimer.

(21) Appl. No.: 14/680,806

(22) Filed: Apr. 7, 2015

(65) Prior Publication Data

US 2016/0185939 A1   Jun. 30, 2016

(30) Foreign Application Priority Data

Dec. 29, 2014   (CN) .......................... 2014 1 0844103

(51) Int. Cl.
| | | |
|---|---|---|
| *B32B 27/38* | (2006.01) | |
| *C08K 5/357* | (2006.01) | |
| *C08J 5/24* | (2006.01) | |
| *C08K 3/36* | (2006.01) | |
| *C08G 59/40* | (2006.01) | |
| *C08K 5/35* | (2006.01) | |

(52) U.S. Cl.
CPC .......... *C08K 5/357* (2013.01); *C08G 59/4071* (2013.01); *C08J 5/24* (2013.01); *C08K 3/36* (2013.01); *C08K 5/35* (2013.01); *C08J 2363/00* (2013.01)

(58) Field of Classification Search
CPC ... C08K 5/357; C08K 5/35; C08K 3/36; C08J 5/24; C08L 63/00; C08G 59/4071
See application file for complete search history.

(56) References Cited

U.S. PATENT DOCUMENTS

| | | | | |
|---|---|---|---|---|
| 2011/0224345 A1* | 9/2011 | Tzou | ................... | C08G 59/621 |
| | | | | 524/404 |
| 2012/0024580 A1 | 2/2012 | Hsu et al. | | |
| 2014/0178696 A1 | 6/2014 | Yu et al. | | |

FOREIGN PATENT DOCUMENTS

| | | |
|---|---|---|
| CN | 101880294 A | 11/2010 |
| CN | 103554184 A | 2/2014 |
| CN | 103724575 A | 4/2014 |
| CN | 103834168 A | 6/2014 |
| CN | 103965624 A | 8/2014 |
| CN | 103992622 A | 8/2014 |
| CN | 104024338 A | 9/2014 |
| EP | 2290009 A1 | 3/2011 |
| JP | 2007184558 A | 7/2007 |
| KR | 20000025443 A | 5/2000 |
| KR | 20050087793 A | 8/2005 |
| KR | 20140029717 A | 3/2014 |
| TW | 201031292 A | 8/2010 |

OTHER PUBLICATIONS

STIC Search Report dated Aug. 23, 2016.*
European Search Report for Patent App. No. 15163407.8-1301 dated May 25, 2016.
International Search Report for PCT/CN2015/080540 dated Sep. 8, 2015.

* cited by examiner

*Primary Examiner* — Eisa Elhilo

(74) *Attorney, Agent, or Firm* — McDonald Hopkins LLC

(57) ABSTRACT

The present invention relates to a halogen-free thermosetting resin composition and also a prepreg and a laminate for printed circuits prepared from the halogen-free thermosetting resin composition. The halogen-free thermosetting resin composition comprises, based on 100 parts by weight of organic solids, (A) from 30 to 60 parts by weight of a halogen-free epoxy resin, (B) from 20 to 50 parts by weight of a compound containing dihydrobenzoxazine ring, (C) from 10 to 40 parts by weight of a phosphorus-containing bisphenol curing agent. The prepreg and laminate for printed circuits prepared from the halogen-free thermosetting resin composition according to the present invention have high glass transition temperature, excellent dielectric properties, low water absorption, high thermal resistance and better processability, and can fulfill halogen-free flame retardancy and achieve UL94 V-0 grade.

19 Claims, No Drawings

HALOGEN-FREE THERMOSETTING RESIN COMPOSITION, AND PREPREG AND LAMINATE FOR PRINTED CIRCUITS USING THE SAME

TECHNICAL FIELD

The present invention relates to a halogen-free thermosetting resin composition, and also to a prepreg and a laminate for printed circuits prepared from the halogen-free thermosetting resin composition.

BACKGROUND ART

For conventional laminates for printed circuits, brominated flame retardants, especially tetrabromobisphenol-A epoxy resin, are usually used to achieve flame retardancy. Such brominated epoxy resin has better flame retardancy, but will produce hydrogen bromide during combustion. In addition, carcinogens, such as dioxin, dibenzofuran and the like, have been detected recently in the combustion products of electrical and electronic equipment wastes containing halogens, such as bromide, fluorine and the like. Thus the application of brominated epoxy resin has been limited. Two European Union environment-protecting directives, *Waste Electrical and Electronic Equipment Directive* and *The Restriction of the use of Certain Hazardous Substances in Electrical and Electronic Equipment*, were formally implemented on Jul. 1, 2006. The development of halogen-free flame-retardant copper-clad laminates became a hot spot in the industry, and the cooper-clad laminate manufacturers have launched their own halogen-free flame-retardant copper-clad laminates in response.

Meanwhile, with the high speed and multifunctional development of information processing of consumer electronic product, the application frequencies continue to increase. Besides increasing environmental requirements, there are increasing requirements on low dielectric constant and dielectric dissipation values. Thus it becomes a pursuit not to decrease Dk/Df in the substrate industry. For conventional FR-4 materials, dicyandiamide is mostly used as a curing agent. Such a curing agent has a tertiary reactive amine and has better processability. However, the cured product has a lower thermal decomposition temperature due to its weaker C—N bond which is easy to split under high temperature, so that it cannot meet the requirements on thermal resistance for lead-free processes. In this context, they began to use phenolic resin as the epoxy curing agent in the industry with the large scale implementation of lead-free process in 2006. Phenolic resin has a benzene ring structure of high density, so that the epoxy-cured system has excellent thermal resistance. However, the dielectric properties of the cured products have a tendency to deteriorate.

CONTENTS OF THE INVENTION

Upon studies, the applicant found that phosphorus-containing bisphenol may be used as the curing agent of epoxy resins, wherein reaction groups include hydroxyl groups at both sides and phosphorus units, without any production of secondary hydroxyl groups during the reaction. The cured products have a high glass transition temperature and excellent dielectric properties and thermal resistance. In addition, phosphorus-containing bisphenol has a high phosphorus content and has the effects of a halogen-free flame retardant when used as a curing agent, so as to greatly decrease the addition amount of flame retardant.

One objective of the present invention is to provide a halogen-free thermosetting resin composition and also a prepreg and a laminate for printed circuits prepared from the halogen-free thermosetting resin composition. The laminate for printed circuits prepared by using such a resin composition has a high glass transition temperature, excellent dielectric properties, low water absorption, high thermal resistance and better processability. In addition, it can also fulfill halogen-free flame retardancy and achieve UL94 V-0.

In order to achieve the above objective, the applicant conducted repeated, deep studies and found that the composition obtained by suitably mixing halogen-free epoxy resin, compounds containing a dihydrobenzoxazine ring, phosphorus-containing bisphenol curing agent, and optionally other substances can achieve such an objective.

That is to say, the following technical solution is used in the present invention: a halogen-free thermosetting resin composition, comprising the following three substances as essential components, based on 100 parts by weight of organic solids,
(A) from 30 to 60 parts by weight of a halogen-free epoxy resin,
(B) from 20 to 50 parts by weight of a compound containing a dihydrobenzoxazine ring, and
(C) from 10 to 40 parts by weight of a phosphorus-containing bisphenol curing agent.

The halogen-free thermosetting resin composition of the present invention uses a halogen-free epoxy resin having specific molecular structures and has higher functionality and better dielectric properties. The cured products have a higher Tg and a low water absorption.

In addition, the halogen-free thermosetting resin composition of the present invention uses compounds containing a dihydrobenzoxazine ring. Such compounds have a high Tg and excellent dielectric properties and thermal resistance, but a low water absorption. After the compound containing a dihydrobenzoxazine ring is added to the halogen-free epoxy resin, the cured products not only have a high Tg, high thermal resistance and low water absorption, but also have excellent dielectric properties and a higher modulus. A higher modulus can improve the expansion and contraction of laminates during processing. In addition, such compound containing a dihydrobenzoxazine ring contains nitrogen which has a synergistic flame retardant effect together with phosphorus in phosphorus-containing bisphenol to decrease the phosphorus content as required for the flame retardancy of the cured products to achieve UL 94 V-0 and further decrease the water absorption.

Moreover, the halogen-free thermosetting resin composition of the present invention uses a phosphorus-containing bisphenol as curing agent and flame retardant. This phosphorus-containing bisphenol structure has a high structural symmetry. Moreover, the phosphorus may react with secondary hydroxyl in epoxy resin and the cured products have a high Tg and excellent dielectric properties. In addition, such phosphorus-containing bisphenol has a high phosphorus content and can fulfill halogen-free flame retardancy without sacrificing the Tg, dielectric properties, thermal resistance and moisture resistance of the cured products. The cured products have the flame retardancy of UL94 V-0 grade.

Each component is disclosed in detail below.

For component (A) in the present invention, i.e., halogen-free epoxy resin, the amount thereof is suggested to be properly from 30 to 60 parts by weight, e.g., 32, 34, 36, 38, 40, 42, 44, 46, 48, 50, 52, 54, 56 or 58 parts by weight.

Preferably, the halogen-free epoxy resin is any one or a mixture of at least two resins selected from bisphenol-A epoxy resin, bisphenol-F epoxy resin, o-cresol novolac epoxy resin, bisphenol-A novolac epoxy resin, trisphenol novolac epoxy resin, dicyclopentadiene novolac epoxy resin, biphenyl novolac epoxy resin, alkylbenzene novolac epoxy resin and naphthol novolac epoxy resin. The aforesaid epoxy resins are all halogen-free epoxy resins.

Preferably, the halogen-free epoxy resin is selected from the epoxy resin having the following structure:

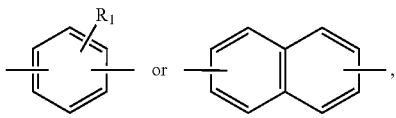

wherein, $X_1$, $X_2$ and $X_3$ are each independently selected from:

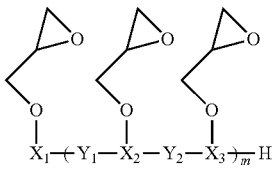

$R_1$ is any one selected from hydrogen atom, substituted or unsubstituted C1-C5 (e.g., C2, C3, C4) linear alkyl, and substituted or unsubstituted C1-C5 (e.g., C2, C3, C4) branched alkyl;

$Y_1$ and $Y_2$ are each independently any one selected from single bonds, —CH$_2$—,

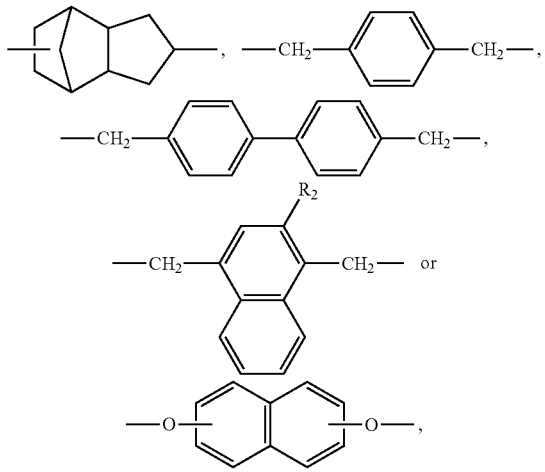

wherein m is any integer from 1 to 10, e.g., 2, 3, 4, 5, 6, 7, 8 or 9; $R_2$ is any one selected from hydrogen atom, substituted or unsubstituted C1-C5 (e.g., C2, C3, C4) linear alkyl, and substituted or unsubstituted C1-C5 (e.g., C2, C3, C4) branched alkyl.

The halogen-free thermosetting resin composition of the present invention employs the above halogen-free epoxy resin having the aforesaid specific molecular structure and has a higher functionality and better dielectric properties. The cured products thereof have a higher Tg and a low water absorption.

Component (B) in the present invention is a compound containing a dihydrobenzoxazine ring.

Preferably, the compound containing a dihydrobenzoxazine ring is any one or a mixture of at least two compounds selected from benzoxazine of formula (I) or formula (II), including bisphenol-A benzoxazine, bisphenol-F benzoxazine, MDA(4,4'-methylenedianiline)-type benzoxazine, phenolphthalein benzoxazine and dicyclopentadiene benzoxazine:

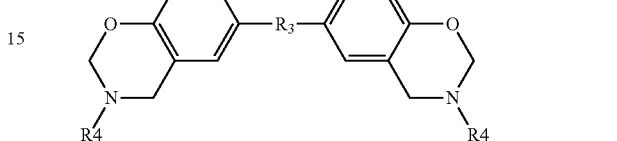

Formula (I)

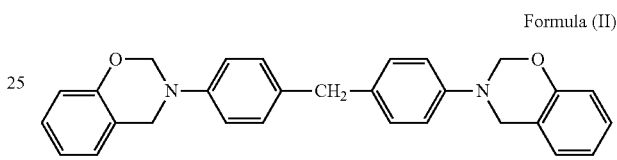

Formula (II)

wherein, $R_3$ is selected from the group consisting of

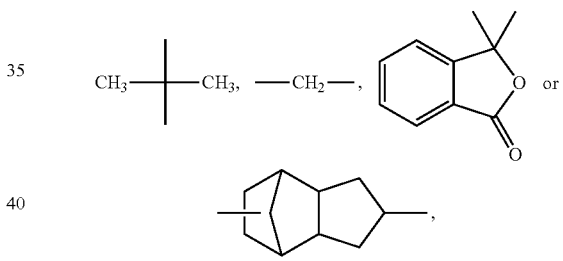

and $R_4$ is

Preferably, component (B) of the present invention, i.e., the compound containing a dihydrobenzoxazine ring, is added in an amount of from 20 to 50 parts by weight, e.g., 20, 22, 24, 26, 28, 30, 32, 34, 36, 38, 40, 42, 44, 46, or 48 parts by weight. If the addition amount is less than 20 parts by weight, the decreasing effect on water absorption of the cured products and the synergistic flame retardant effect with phosphorus will not be obvious; if the addition amount is higher than 50 parts by weight, the cured products will have a higher brittleness and a worse workability.

Component (C) of the present invention, i.e., phosphorus-containing bisphenol, is used as curing agent and flame retardant.

Preferably, the phosphorus-containing bisphenol has the following structure:

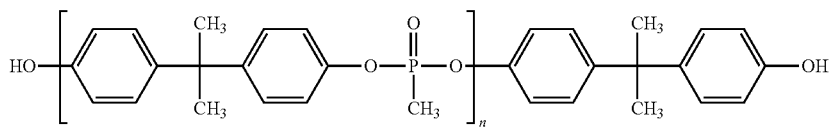

wherein n is any integer from 2 to 20, e.g., 3, 4, 5, 6, 7, 8, 9, 10, 11, 12, 13, 14, 15, 16, 17, 18, or 19, preferably any integer from 3 to 10.

Preferably, the phosphorus-containing bisphenol has a weight average molecular weight of from 1000 to 6500, preferably from 1000 to 4500, and more preferably from 1000 to 3000. When the weight average molecular weight is less than 1000, the cured products have a low Tg and a worse thermal resistance; when the weight average molecular weight is higher than 6500, the phosphorus-containing bisphenol has a worse solubility in organic solvents, so that a better and homogeneous varnish cannot be obtained, and the processing requirements of the copper-clad plates cannot be met.

The phosphorus-containing bisphenol in the present invention is added in an amount of from 10 to 40 parts by weight, e.g., 10, 12, 13, 15, 16, 17, 18, 19, 21, 22, 24, 25, 27, 28, 30, 31, 33, 34, 36, 37, 39, or 40 parts by weight. If the addition amount is too low, the epoxy resin will not completely cure. The cured products have a low glass transition temperature, worse dielectric properties and flame retardancy properties; if the addition amount is too high, the cured products will have a higher water absorption.

Preferably, the halogen-free thermosetting resin composition of the present invention further comprises (D) a curing accelerator, which is not specially defined, only if that can catalyze the reaction of epoxy functional groups and lower the reaction temperature of the curing system, and is preferably any one or a mixture of at least two accelerators selected from imidazole compounds, derivatives of imidazole compounds, piperidine compounds, Lewis acid and triphenylphosphine.

The imidazole compounds are any one or a mixture of at least two compounds selected from 2-methylimidazole, 2-ethyl-4-methylimidazole, 2-phenylimidazole and 2-undecylimidazole.

The piperidine compounds are any one or a mixture of at least two compounds selected from 2,3-diamino piperidine, 2,5-diamino piperidine, 2,6-diamino piperidine, 2-amino-3-methyl piperidine, 2-amino-4-methyl piperidine, 2-amino-3-nitro piperidine, 2-amino-5-nitro piperidine and 2-amino-4,4-dimethyl piperidine.

Preferably, based on 100 parts by weight of the total addition amounts of components (A), (B) and (C), the component (D) is added in an amount of from 0.01 to 1 parts by weight, e.g., 0.05, 0.1, 0.15, 0.2, 0.25, 0.3, 0.35, 0.4, 0.45, 0.5, 0.55, 0.6, 0.65, 0.7, 0.75, 0.8, 0.85, 0.9 or 0.95 parts by weight, preferably from 0.05 to 0.8 parts by weight, and more preferably from 0.05 to 0.6 parts by weight.

Preferably, the halogen-free thermosetting resin composition of the present invention further comprises (E), a filler, which is added as required, and the amount of which is not specifically limited. The filler is selected from organic fillers and inorganic fillers, preferably from inorganic fillers, more preferably surface-treated inorganic fillers, and most preferably surface-treated silica.

The surface-treated surface treating agent is any one or a mixture of at least two agents selected from a silane coupling agent, a silicone oligomer and a titanate coupling agent.

Based on 100 parts by weight of the inorganic filler, the surface treating agent is added in an amount from 0.1 to 5.0 parts by weight, e.g., 0.4, 0.8, 1.2, 1.6, 2, 2.4, 2.8, 3.2, 3.6, 4, 4.4 or 4.8 parts by weight, preferably from 0.5 to 3.0 parts by weight, and more preferably from 0.75 to 2.0 parts by weight.

Preferably, the inorganic filler is any one or a mixture of at least two fillers selected from non-metal oxides, metal nitrides, non-metal nitrides, inorganic hydrates, inorganic salts, metal hydrates and inorganic phosphorus, and more preferably is one or a mixture of at least two fillers selected from fused silica, crystalline silica, spherical silica, hollow silica, aluminum hydroxide, alumina, talc, aluminum nitride, boron nitride, silicon carbide, barium sulfate, barium titanate, strontium titanate, calcium carbonate, calcium silicate, and mica.

Preferably, the organic filler is any one or a mixture of at least two fillers selected from polytetrafluoroethylene powder, polyphenylene sulfide and polyether sulfone powder.

Preferably, there is no special limitation for the shape and particle size of the filler. Preferably, the filler has a median particle diameter of from 0.01 to 50 µm, e.g., 1, 6, 11, 16, 21, 26, 31, 36, 41, or 46 µm, preferably from 0.01 to 20 µm, and more preferably from 0.1 to 10 µm. The filler of this particle size range is easier to disperse in the varnish.

In addition, the addition amount of component (E) is not specifically limited. Based on 100 parts by weight of the total addition amounts of components (A), (B) and (C), the component (E) is added in an amount of from 5 to 300 parts by weight, e.g., 10, 30, 50, 70, 90, 110, 130, 150, 170, 190, 210, 230, 250, 270, or 290 parts by weight, preferably from 5 to 200 parts by weight, and more preferably from 5 to 150 parts by weight.

The wording "comprise" in the invention means that, besides said components, there may be other components which endow the halogen-free thermosetting resin composition with different properties. In addition, the wording "comprise" in the present invention may be replaced with "is/are" or "consist of" in a closed manner.

For example, the halogen-free thermosetting resin composition may further comprise various additives. As specific examples, phosphorus-containing flame retardants, antioxidants, thermal stabilizers, antistatic agents, ultraviolet light absorbers, pigments, colorants or lubricants may be used. These additives may be used separately or in combination.

The halogen-free thermosetting resin composition of the present invention is conventionally prepared by adding the solids first, then adding liquid solvent, stirring until the solids are completely dissolved, then adding liquid resin and optionally curing accelerator, continuing to homogeneously stir.

The solvent in the present invention is not specifically limited. As specific examples, alcohols, such as methanol, ethanol, butanol and the like, ethers, such as ethyl cellosolve, butyl cellosolve, glycol methylether, carbitol, butyl carbitol, and the like, ketones, such as acetone, butanone, methylethyl ketone, cyclohexanone and the like, aromatic hydrocarbons, such as toluene, xylene, and the like, esters, such as ethyl acetate, ethoxyethyl acetate, and the like, and nitrogen-containing solvents, such as N,N-dimethylformamide, N,N-dimethylacetamide and the like can be used. The aforesaid solvents can be used separately or in combination. Ketones, such as acetone, butanone, methylethyl ketone, cyclohexanone and the like, are preferred. The addition amount of the solvents is determined by those skilled in the art according to their experiences, and it is better to make the resin varnish reach a suitable viscosity.

The second object of the present invention is to provide a prepreg comprising a reinforcing material and the halogen-free thermosetting resin composition above which is attached thereon after impregnation and drying.

The reinforcing material used herein is not specifically limited. It may be organic fibers, inorganic fibers, woven fabrics, or non-woven fabrics. The organic fibers may be aramid non-woven fabrics. The inorganic fibers woven fabrics may be E-glass fabrics, D-glass fabrics, S-glass fabrics, T-glass fabrics, NE-glass fabrics, or quartz fabrics. The thickness of the reinforcing material is not specifically limited. For better size stability of laminates, the woven fabrics and non-woven fabrics preferably have a thickness from 0.01 to 0.2 mm, and are better treated by the splitting process and surface-treated with silane coupling agent. In order to provide better water resistance and thermal resistance, the silane coupling agent is preferably any one or a mixture of at least two agents selected from an epoxy silane coupling agent, an amino silane coupling agent or an ethylene silane coupling agent. The reinforcing material is impregnated with the above halogen-free thermosetting resin composition and baked at 100-250° C. for 1-15 min to obtain the prepreg.

The third object of the present invention is to provide a laminate comprising at least one prepreg above. The laminate is obtained by binding at least more than one prepreg via heating and pressing.

The laminate is prepared by curing in a thermocompressor at a curing temperature of from 150-250° C.—and a curing pressure of from 10 to 60 Kg/cm$^2$.

The fourth object of the present invention is to provide a halogen-free, high-frequency circuit base board comprising at least one prepreg above and metal foils coated on one or two sides of the laminated prepregs.

The metal foils are copper foils, nickel foils, aluminum foils, SUS foils, and the like, and the materials thereof are not limited.

As compared with the prior art, the present invention has the following beneficial effects.

In the present invention, the halogen-free thermosetting resin composition uses compounds containing a dihydrobenzoxazine ring. Such compounds have a high Tg, good dielectric properties and thermal resistance, and a low water absorption. They greatly increase the Tg of the cured products, and improve the dielectric properties, thermal resistance, and water absorption. In addition, these compounds containing a dihydrobenzoxazine ring contain nitrogen which has a synergistic flame retardant effect together with phosphorus in phosphorus-containing bisphenol to decrease the phosphorus content as required for the flame retardancy of the cured products to achieve UL 94 V-0 and further decrease the water absorption.

Moreover, the halogen-free thermosetting resin composition of the present invention uses a phosphorus-containing bisphenol as curing agent and flame retardant. This phosphorus-containing bisphenol structure has a high structural symmetry. Moreover, phosphorus in the compounds may react with secondary hydroxyl in epoxy resin and the cured products will have a high Tg and excellent dielectric properties. In addition, such phosphorus-containing bisphenol has a high phosphorus content and can fulfill halogen-free flame retardancy without sacrificing the Tg, dielectric properties, thermal resistance and moisture resistance of the cured products, wherein the flame retardancy of the cured products may achieve UL94 V-0 grade.

The prepreg and laminate for printed circuits prepared from the halogen-free thermosetting resin composition according to the present invention have high glass transition temperature, excellent dielectric properties, low water absorption and high thermal resistance, and can fulfill halogen-free flame retardancy and achieve UL94 V-0 grade.

EMBODIMENTS

The technical solution of the present invention is further disclosed by the following embodiments.

For the laminates (8 prepregs, the reinforcing material which has a model of No. 2116 and a thickness of 0.08 mm) for printed circuits prepared according to the aforesaid disclosure, the glass transition temperature, dielectric constant, dielectric dissipation factor, water absorption, thermal resistance and flame retardancy and the like, were tested and further disclosed and described in detail in the following examples.

Please refer to Examples 1-7 and Comparative Examples 1-9. If no special instructions, "parts" thereafter refers to "parts by weight," and "%" refers to "wt %."

(A) Halogen-free epoxy resin
  (A-1) Dicyclopentadiene epoxy resin HP-7200H (produced by DIC, Japan, and having an EEW: 275 g/eq)
  (A-2) biphenyl novolac epoxy resin NC-3000H (produced by Nippon Kayaku Co Ltd, Japan, and having an EEW: 288 g/eq)
  (B-1) Dicyclopentadiene benzoxazine HUN 8260N70 (produced by HUNTSMAN)
  (B-2) Bisphenol-A benzoxazine HUN 8290N62 (produced by HUNTSMAN)
  (B-3) low-molecular polyphenylene ether resin MX90 (produced by SABIC, America)
(C) Curing agent
  (C-1) Phosphorus-containing bisphenol FRX OL1001 (produced by FRX Polymers, America, having a phosphorus content of 8.5%)
  (C-2) Polyphosphonate OL5000 (produced by FRX Polymers, America, having a phosphorus content of 10.8%) having the following structure:

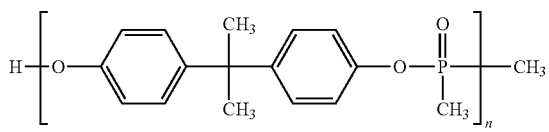

(C-3) Active ester curing agent HPC-8000-65T (produced by DIC, Japan)
  (C-4) Linear novolac 2812 (produced by MOMENTIVE, Korea)
(D) Accelerator: 2-phenylimidazole (produced by Shikoku Chemicals, Japan)
(E) Filler: fused silica (having an average particle diameter of from 1 to 10 μm and a purity of more than 99%)

TABLE 1

The Formula Composition and Physical Property Data of Each Example

|  | Exp. 1 | Exp. 2 | Exp. 3 | Exp. 4 | Exp. 5 | Exp. 6 | Exp. 7 |
|---|---|---|---|---|---|---|---|
| A-1 | 30 | 45 | 60 | 30 | — | 45 | — |
| A-2 | — | — | — | — | 40 | — | 45 |
| B-1 | 40 | 25 | 20 | 50 | — | — | 25 |
| B-2 | — | — | — | — | 20 | 25 | — |
| B-3 | — | — | — | — | — | — | — |
| C-1 | 30 | 30 | 20 | 10 | 40 | 30 | 30 |
| C-2 | — | — | — | — | — | — | — |
| C-3 | — | — | — | — | — | — | — |
| C-4 | — | — | — | — | — | — | — |
| D | q.s. | q.s. | q.s. | q.s. | q.s. | q.s. | q.s. |
| E | 40 | 40 | 40 | 40 | 40 | 40 | 40 |
| Glass transition temperature (DSC) ° C. | 185 | 182 | 179 | 188 | 175 | 182 | 186 |
| Dielectric constant (1 GHz) | 3.58 | 3.56 | 3.55 | 3.60 | 3.52 | 3.61 | 3.55 |
| Dielectric dissipation (1 GHz) | 0.0078 | 0.0075 | 0.0071 | 0.0079 | 0.0065 | 0.0088 | 0.0085 |
| Water absorption (%) | 0.07 | 0.07 | 0.08 | 0.06 | 0.08 | 0.07 | 0.07 |
| DMA modulus, MPa | 14210 | 13985 | 13850 | 13720 | 13942 | 13841 | 13960 |
| Solder dipping 288° C., s | >120 | >120 | >120 | >120 | >120 | >120 | >120 |
| Incombustibility | V-0 | V-0 | V-0 | V-0 | V-0 | V-0 | V-0 |

TABLE 2

The Formula Composition and Physical Property Data of Each Comparative Examples

|  | Com. Exp. 1 | Com. Exp. 2 | Com. Exp. 3 | Com. Exp. 4 | Com. Exp. 5 | Com. Exp. 6 | Com. Exp. 7 |
|---|---|---|---|---|---|---|---|
| A-1 | 45 | — | — | 45 | — | 45 | — |
| A-2 | — | 45 | 45 | — | 45 | — | 45 |
| B-1 | 25 | 25 | — | 25 | — | 25 | — |
| B-2 | — | — | 25 | — | 25 | — | 25 |
| B-3 | — | — | — | — | — | — | — |
| C-1 | — | — | — | — | — | — | — |
| C-2 | 30 | 30 | 30 | — | — | — | — |
| C-3 | — | — | — | 30 | 30 | — | — |
| C-4 | — | — | — | — | — | 30 | 30 |
| D | q.s. | q.s. | q.s. | q.s. | q.s. | q.s. | q.s. |
| E | 40 | 40 | 40 | 40 | 40 | 40 | 40 |
| Glass transition temperature (DSC) ° C. | 155 | 153 | 148 | 165 | 168 | 175 | 167 |
| Dielectric constant (1 GHz) | 3.91 | 3.90 | 3.97 | 3.71 | 3.73 | 3.92 | 3.98 |
| Dielectric dissipation (1 GHz) | 0.0095 | 0.0088 | 0.0099 | 0.0091 | 0.099 | 0.0095 | 0.0102 |
| Water absorption (%) | 0.15 | 0.15 | 0.16 | 0.12 | 0.11 | 0.08 | 0.07 |
| DMA modulus, MPa | 12795 | 12580 | 13650 | 11523 | 10954 | 12834 | 13052 |
| Solder dipping 288° C., s | >120 | >120 | >120 | 112 | 85 | >120 | >120 |
| Incombustibility | V-0 | V-0 | V-0 | V-1 | V-1 | V-1 | V-1 |

|  | Com. Exp. 8 | Com. Exp. 9 |
|---|---|---|
| A-1 | 45 | — |
| A-2 | — | 45 |
| B-1 | — | — |
| B-2 | — | — |
| B-3 | 25 | 25 |
| C-1 | 30 | 30 |
| C-2 | — | — |
| C-3 | — | — |
| C-4 | — | — |
| D | q.s. | q.s. |
| E | 40 | 40 |
| Glass transition temperature (DSC) ° C. | 152 | 155 |
| Dielectric constant (1 GHz) | 3.54 | 3.52 |
| Dielectric dissipation (1 GHz) | 0.0066 | 0.0060 |
| Water absorption (%) | 0.10 | 0.09 |
| DMA modulus, MPa | 9620 | 9854 |
| Solder dipping 288° C., s | >120 | >120 |
| Incombustibility | V-1 | V-1 |

The aforesaid properties are tested by
(a) Glass transition temperature (Tg): measured by differential scanning calorimetry (DSC) according to DSC method specified in IPC-TM-650 2.4.25.
(b) Dielectric constant and dielectric dissipation factor: measuring the dielectric constant and dielectric dissipation factor at 1 GHz by the resonance method using a strip line according to IPC-TM-650 2.5.5.5.
(c) Water absorption: measured according to the method of IPC-TM-650 2.6.2.1.
(d) DMA modulus: measured according to the method of IPC-TM-650 2.4.24.4.
(e) Solder dipping: observing the layering and blistering time according to IPC-TM-650 2.4.13.1.
(f) Flame retardancy: measured according to UL 94 vertical burning method.

According to the physical property data in Tables 1 and 2, polyphosphonate was used in Comparative Example 1 to cure dicyclopentadiene epoxy resin and dicyclopentadiene benzoxazine resin; polyphosphonate was used in Comparative Example 2 to cure dicyclopentadiene epoxy resin and bisphenol-A benzoxazine resin; polyphosphonate was used in Comparative Example 3 to cure biphenyl novolac epoxy resin and bisphenol-A benzoxazine resin, the copper-clad laminates prepared thereby have a lower glass transition temperature, general dielectric properties, and higher water absorption. Active ester was used in Comparative Example 4 to cure dicyclopentadiene epoxy resin and dicyclopentadiene benzoxazine resin. Active ester was used in Comparative Example 5 to cure biphenyl novolac epoxy resin and bisphenol-A benzoxazine resin, and the copper-clad laminates prepared thereby have better dielectric properties, general glass transition temperature, high water absorption, but worse thermal resistance and flame retardancy. Linear novolac was used in Comparative Example 6 to cure dicyclopentadiene epoxy resin and dicyclopentadiene benzoxazine resin, and was used in Comparative Example 7 to cure biphenyl novolac epoxy resin and bisphenol-A benzoxazine resin, and the copper-clad laminates prepared thereby have a higher dielectric constant and dielectric dissipation so that they cannot meet the requirements of laminates on the dielectric properties in thermosetting high speed field. Moreover, they have a worse flame retardancy of V-1. Phosphorus-containing bisphenol was used in Comparative Example 8 to cure dicyclopentadiene epoxy resin and low-molecular polyphenylene ether, and was used in Comparative Example 9 to cure biphenyl novolac epoxy resin and low-molecular polyphenylene ether. The laminates prepared thereby have excellent dielectric properties, but a lower glass transition temperature and DMA modulus and a worse flame retardancy. In Examples 1-7, halogen-free epoxy resin and benzoxazine resin were used as the main parts. The resultant laminates cured with phosphorus-containing bisphenol have a high glass transition temperature, excellent dielectric properties, high thermal resistance and low water absorption. The laminates fulfill halogen-free flame retardancy and achieve UL94 V-0 grade.

As stated above, the laminate for printed circuits of the present invention, as compared with general laminates, has higher glass transition temperature, better dielectric properties, moisture resistance, and heat resistance, and is suitable for thermosetting field. In addition, the halogen content can achieve the V-0 standard in the flame retardancy test UL94 within the scope of JPCA halogen-free standard requirements, and have the effect of environmental protection.

The applicant declares that the present invention discloses the detailed method of the present invention by the above examples, but the present invention is not limited to the detailed method, i.e., it does not mean that the present invention cannot be fulfilled unless the aforesaid detailed method is used. Those skilled in the art shall know that, any amendment, equivalent change to the product materials of the present invention, addition of auxiliary ingredients, and selection of any specific modes all fall within the protection scope and disclosure scope of the present invention.

The invention claimed is:

1. A halogen-free thermosetting resin composition, based on 100 parts by weight of organic solids, comprising
(A) from 30 to 60 parts by weight of a halogen-free epoxy resin,
(B) from 20 to 50 parts by weight of a compound containing dihydrobenzoxazine ring,
and
(C) from 10 to 40 parts by weight of a phosphorus-containing bisphenol curing agent.

2. The halogen-free thermosetting resin composition of claim 1, characterized in that the halogen-free epoxy resin is any one selected from bisphenol-A epoxy resin, bisphenol-F epoxy resin, o-cresol novolac epoxy resin, bisphenol-A novolac epoxy resin, trisphenol novolac epoxy resin, dicyclopentadiene novolac epoxy resin, biphenyl novolac epoxy resin, alkylbenzene novolac epoxy resin and naphthol novolac epoxy resin, or a mixture of at least two selected therefrom.

3. The halogen-free thermosetting resin composition of claim 1 wherein the halogen-free epoxy resin is selected from the epoxy resin having the following structure:

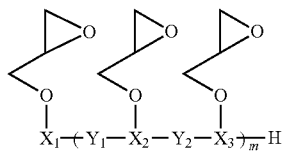

wherein $X_1$, $X_2$ and $X_3$ are each independently selected from

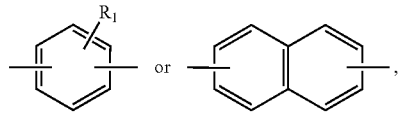

$R_1$ is any one selected from hydrogen atom, substituted or unsubstituted C1-C5 linear alkyl, and substituted or unsubstituted C1-C5 branched alkyl;

$Y_1$ and $Y_2$ are each independently any one selected from single bonds, —$CH_2$—,

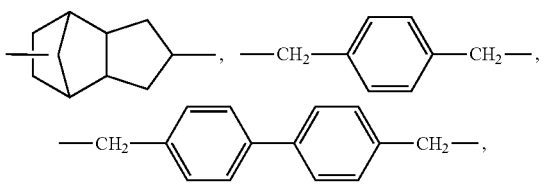

-continued

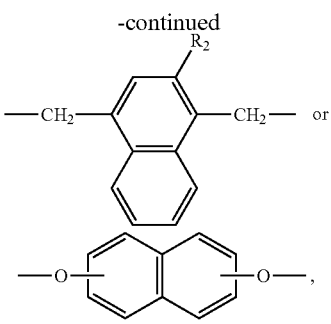 or wherein m is any integer from 1 to 10; $R_2$ is any one selected from hydrogen atom, substituted or unsubstituted C1-C5 linear alkyl, and substituted or unsubstituted C1-C5 branched alkyl.

4. The halogen-free thermosetting resin composition of claim 1 wherein the compound containing dihydrobenzoxazine ring is any one selected from benzoxazine of formula (I) or formula (II), including bisphenol-A benzoxazine, bisphenol-F benzoxazine, MDA(4,4'-methyl-type benzoxazine, phenolphthalein benzoxazine and dicyclopentadiene benzoxazine, or a mixture of at least two selected therefrom;

Formula (I)

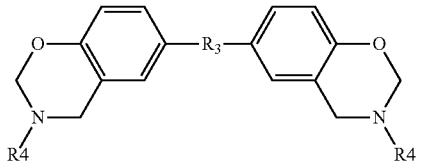

Formula (II)

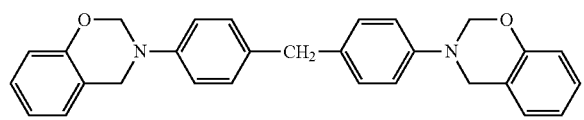

wherein, $R_3$ is selected from the group consisting of

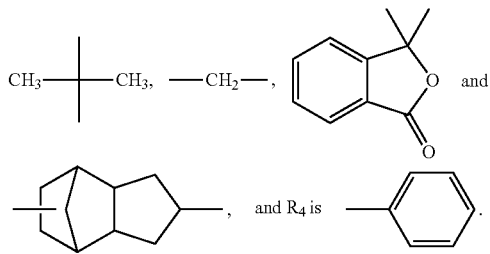

5. The halogen-free thermosetting resin composition of claim 1 wherein the phosphorus-containing bisphenol curing agent has the following structure:

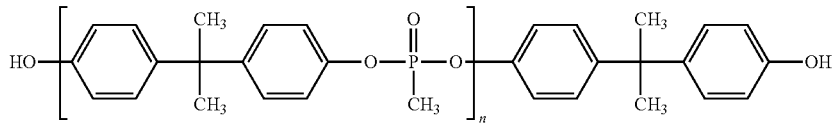

wherein n is any integer from 2 to 20.

6. The halogen-free thermosetting resin composition of claim 1 wherein the phosphorus-containing bisphenol curing agent has a weight average molecular weight of from 1000 to 6500.

7. The halogen-free thermosetting resin composition of claim 1 wherein the halogen-free thermosetting resin composition further comprises (D) a curing accelerator.

8. The halogen-free thermosetting resin composition of claim 7 wherein the curing accelerator is any one selected from imidazole compounds, derivatives of imidazole compounds, piperidine compounds, Lewis acid and triphenylphosphine, or a mixture of at least two selected therefrom.

9. The halogen-free thermosetting resin composition of claim 8 wherein the curing accelerator is any one selected from 2-methylimidazole, 2-ethyl-4-methylimidazole, 2-phenylimidazole and triphenylphosphine, or a mixture of at least two selected therefrom.

10. The halogen-free thermosetting resin composition of claim 7 wherein based on 100 parts by weight of the total addition amounts of components (A), (B) and (C), the component (D) is added in an amount of from 0.01 to 1 parts by weight.

11. The halogen-free thermosetting resin composition of claim 1 wherein the halogen-free thermosetting resin composition further comprises (E) a filler.

12. The halogen-free thermosetting resin composition of claim 11 wherein the filler is surface-treated inorganic filler.

13. The halogen-free thermosetting resin composition of claim 12 wherein the surface-treated inorganic filler is surface-treated silica, and the surface-treated surface treating agent is any one selected from a silane coupling agent, a silicone oligomer and a titanate coupling agent, or a mixture of at least two selected therefrom.

14. The halogen-free thermosetting resin of claim 13 wherein based on 100 parts by weight of the inorganic filler, the surface treating agent is in an amount of from 0.1 to 5.0 parts by weight.

15. The halogen-free thermosetting resin composition of claim 11 wherein the filler has a median particle diameter of from 0.01 to 50 μm.

16. The halogen-free thermosetting resin composition of claim 11 wherein based on 100 parts by weight of the total addition amounts of components (A), (B) and (C), the component (E) is added in an amount of from 5 to 300 parts by weight.

17. A prepreg comprising a reinforcing material and the halogen-free thermosetting resin composition of claim 1 which is attached thereon after impregnation and drying.

18. A laminate comprising at least one prepreg according to claim 17.

19. The halogen-free thermosetting resin composition of claim 2 wherein the compound containing dihydrobenzoxazine ring is any one or a mixture of at least two selected from benzoxazine of formula (I) or formula (II), including bisphenol-A benzoxazine, bisphenol-F benzoxazine, MDA-type benzoxazine, phenolphthalein benzoxazine and dicyclopentadiene benzoxazine;

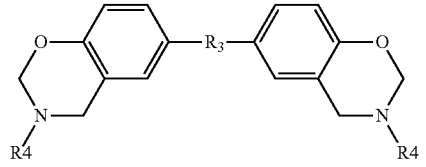
Formula (I)
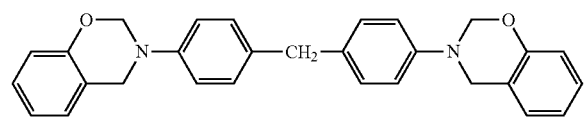
Formula (II)
wherein, R₃ is selected from the group consisting of
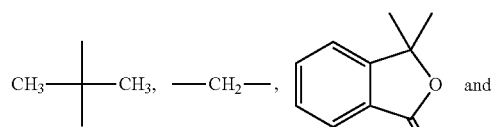
and
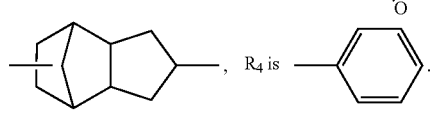
, R₄ is
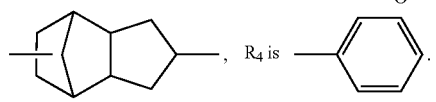
.
* * * * *